United States Patent [19]

Sterghos et al.

[11] Patent Number: 5,730,861
[45] Date of Patent: Mar. 24, 1998

[54] SWIMMING POOL CONTROL SYSTEM

[76] Inventors: Peter M. Sterghos, 5291 40th Ave. N., St. Petersburg, Fla. 33709; John A. Sodeika, 401 150th Ave., #264, Madeira Beach, Fla. 33708; Patrick J. Cosgrove, 647 Garland Cir., Indian Rocks Beach, Fla. 34635; Jeff Godsted, 9065 128th Way N., Seminole, Fla. 34646; Brian D. Kinports, 207 Hillcrest Dr., Safety Harbor, Fla. 34695

[21] Appl. No.: 642,876

[22] Filed: May 6, 1996

[51] Int. Cl.⁶ .......................... B01D 17/12; B01D 35/157
[52] U.S. Cl. ................. 210/86; 4/508; 137/554; 137/625.46; 210/90; 210/108; 210/134; 210/169
[58] Field of Search ................. 210/86, 90, 104, 210/108, 121, 123, 126, 127, 128, 134, 141, 143, 169, 275, 278, 416.2, 425, 426, 427; 137/554, 625.29, 628.46; 4/490, 508

[56] References Cited

U.S. PATENT DOCUMENTS

| | | | |
|---|---|---|---|
| 3,618,774 | 11/1971 | Dolphin | 210/169 |
| 3,630,363 | 12/1971 | Nash | 210/108 |
| 3,640,310 | 2/1972 | Erlich | 137/625.46 |
| 3,834,537 | 9/1974 | Brett | 210/278 |
| 3,837,015 | 9/1974 | Whitaker . | |
| 3,848,627 | 11/1974 | Page | 137/392 |
| 3,895,402 | 7/1975 | Page . | |
| 3,997,925 | 12/1976 | Hough . | |
| 4,115,276 | 9/1978 | Kelly | 210/169 |
| 4,115,877 | 9/1978 | Wall | 210/169 |
| 4,127,485 | 11/1978 | Baker et al. | 210/169 |
| 4,156,437 | 5/1979 | Chivens et al. | 137/625.46 |
| 4,227,266 | 10/1980 | Russell | 4/496 |
| 4,445,238 | 5/1984 | Maxhimer | 4/508 |
| 4,592,098 | 6/1986 | Magnes | 4/508 |
| 4,601,211 | 7/1986 | Whistler | 137/554 |
| 4,627,118 | 12/1986 | Baker | 210/169 |
| 4,676,914 | 6/1987 | Mills et al. | 210/169 |
| 4,869,817 | 9/1989 | Mendoza et al. | 210/278 |
| 4,997,558 | 3/1991 | Baker | 210/169 |
| 5,247,710 | 9/1993 | Carder et al. | 4/508 |

OTHER PUBLICATIONS

"AutoPilots's™ Pool Command Center", Brochure, Manuf. by: Lectranator Systems, Inc., Ft. Lauderdale, Fl. undated.
Figure 7 of Single–Chip Microcontrollers (MCU) "Motorola Master Selection Guide, Rev. 6", undated.
"GEMS Liquid Level Switches," Transamerica Delaval, pp. 2–4, undated.
"Jandy Ji2000" Brochure, ©1990 Manuf. by: Jandy Industries, Inc., Novato, CA.
Declaration of Pete Sterghos, dated Apr. 22, 1996.

*Primary Examiner*—Joseph W. Drodge
*Attorney, Agent, or Firm*—Nixon & Vanderhye P.C.

[57] ABSTRACT

A swimming pool control system automatically controls the daily maintenance functions of a swimming pool. The control system actively monitors system conditions, makes adjustments for abnormal conditions, and provides remote feedback of system problems during its daily cycle. In addition, the control system provides operator assisted manual override operation and control of additional auxiliary equipment. The system includes a novel filter valve, a novel water level system and a novel suction valve that can be run and monitored non-manually by a digital controller.

19 Claims, 12 Drawing Sheets

SWIMMING POOL CONTROL SYSTEM

FIELD OF THE INVENTION

This invention relates to a controller that coordinates and automates many different combinations of periodic swimming pool maintenance chores. More particularly, the invention relates to a specialized electronic controller in combination with swimming pool pumps, filters, valves, and other mechanical components.

BACKGROUND OF THE INVENTION

Maintaining swimming pools can be an arduous task. Swimming pools employ numerous components, including filters, water pumps, water level sensors, heaters, and chlorinators (among others) that must be watched and activated, sometimes on a daily schedule. The effectiveness of one pool maintenance component is oftentimes dependent on the previous proper operation of another component. To insure accurate operation of the pool skimmer, for example, the water level must be watched and adjusted as necessary. To insure clean, debris-free and sanitary swimming water, the filtration system must be routinely activated for a certain duration and the chlorination must be tested and adjusted as necessary. To insure the filter must also be periodically activated for cleaning. These types of maintenance chores are continuously recurring and can be a bothersome nuisance for pool owners.

Several different automatic pool components are known. Pool water level detectors, for example, have been automated. Usually, they take the form of a U-tube with a sensor dropping down into one end of the tube to test for the presence of water at the sensor level. Other water level sensors include two probes that dip into a stilling chamber at two different levels to test for, respectively, high and low water level conditions. When each of these detectors determines that a low water level exists, they generate a signal that causes water to fill the pool.

For heated pools and spas, automatic temperature sensors are also well known. They operate in conjunction with well known heaters of various sorts to control the temperature of the water.

Manual swimming pool pump and filter systems are also known and include a manual multi-port valve that activates various pumping and purging operations. The valves usually include a lever that allows the operator to select from various operations. With the lever in one position, for example, the pump and filter may be used to draw water from the pool, pump it through the filter, and then deliver it back into the pool. In other positions, the pump purges water from the pool or backwashes water through the filter. These valves typically include several fluid lines that connect to, respectively, the output of the filter (to receive filtered water), the input of the filter (to backwash the filter), the input of the pool (to fill the pool), the output of the pool (to drain water for wasting or filtering), and the waste line (such as a sewer line).

In some valves, a rotating disk in the valve connects the different fluid lines depending on the position of the lever. Thus, for example, when the lever is rotated to the "filter" position, it rotates the disk to a position connecting the filter input line to the pool drain line; when it is then moved to the "backwash" position, the disk connects the filter output line to the pool drain line; and so on. One such multi-port valve is shown in U.S. Pat. No. 3,640,310, and in FIG. 12. The entire disclosure of the U.S. Pat. No. 3,640,310 is incorporated herein by reference.

In FIG. 12, a valve body 1201 includes ports labeled "waste," "closed," "filter out," "pool fill," and "filter in (2)," respectively. The valve body also includes "waste," "filter out," "filter in," and "pool fill" outlets that are in fluid connection with their corresponding ports. In a preferred embodiment, a rotor covers the ports, with the rotor having a high pressure input port aligning with one valve port and a low pressure return port aligning with three adjacent opposite valve ports. This, for example, when the high pressure input was aligned with the "filter in" port, the low pressure return would be aligned with (and fluidly connected to) the closed, filter out, and pool fill ports. The result would be a filtering operation where fluid follows the consecutive path of: 1) into the high pressure input, 2) into the "filter in" port, 3) through the "to filter in line," 4) through the filter, 5) through the "to filter out line," 6) into the "filter out" port, 7) into the "pool fill" port, 8) out the "to pool fill line," and 9) into the pool.

The artisan will recognize that other pool maintenance operations occur when the high pressure input is aligned to other valve ports (with the low pressure return aligned with the corresponding three adjacent opposite valve ports).

SUMMARY OF THE INVENTION

The present invention provides a system for automatically maintaining a pool, including a novel control unit together with a combination of pool components. The pool components include a heater, a lighting system, a pump, a filter (such as a sand filter), a water level sensor, and a servo-control multi-port valve that works in synergy with the control unit to efficiently automate the filtering, filling, wasting, backwashing, filter rinsing and circulation operations. While some of the components are known, such as the heater, lighting system, and sand filter, the present invention provides various combinations of components with particular automated control to reduce the hassles of pool maintenance as a whole. The present invention also provides new types of multiport valves and water level sensors that are particularly conducive to the present automated control.

The present swimming pool control system automatically controls the daily maintenance functions of a swimming pool. The control system actively monitors system conditions, makes adjustments for abnormal conditions, and provides remote feedback of system problems during its daily cycle. In addition, the control system provides operator assisted manual override operation and control of additional auxiliary equipment.

The controller can work together with a novel water level detector, a novel filter valve system, a novel suction valve, and other pool components to form a coherent, reduced-maintenance swimming pool maintenance system. The water level detector includes a water chamber, located remotely from the pool, that includes a fluid line connected at one end to the chamber and at the other end to the drain line of the pool. When the pool drain line is not operational, the fluid line of the water level detector has a positive pressure, thus filling the water level in the water chamber to the water level of the pool. Perturbations caused by waves or disturbances that may exist in the pool do not affect the water level in the water chamber since it is filled at a position remotely from the pool and since it is filled via the pool drain line located on the pool floor. The level detector includes two magnetic reed switches to detect, respectively, the high and low water conditions in the water chamber. When the pool drain line is operational, the fluid line of the water level detector will have a negative fluid pressure, thus drawing water out of the water chamber. During pool drain line operation, the present level sensor permits the water chamber to drain below the low water magnetic reed switch, but not to drain completely. Instead, a ball plug at the base of the water level detector seals the water chamber from the fluid line before the water chamber completely empties in order to prevent air in the water chamber from entering the drain pump.

The control system also works in synergy with a new servo-control multi-port disk type valve that automatically connects various fluid ports in the valve depending upon the location of the disk. On the disk, input and output sections can physically align with different fluid ports located in a valve body. In one embodiment, the valve body includes the six ports shown in FIG. 12 connected to the pool fill, filter input (2), filter output, closed and waste lines, respectively. Depending upon which of the ports are connected in fluid flow (based on where the input and output sections of the disk align), the valve will permit filtering, backwashing, filter rinsing, filling, wasting, and non-filtered circulation operations.

The present disk is connected to a rotor which is connected to a solenoid and a position detector. The position detector identifies for the controller where the input and output sections of the disk are located relative to the various fluid ports. When an instruction is generated (for example, to backwash the filter), the controller first detects the position of the disk relative to the fluid ports. If the disk needs to be moved for it to be in the appropriate position to perform the current instruction, the solenoid is de-energized, allowing the disk to raise off of the fluid ports by the biasing of a spring. The rotor then rotates the disk until the controller detects via the position detector that the disk is in the appropriate position to perform the current instruction. The solenoid is then energized, forcing the disk down onto the fluid ports (against the bias of the spring) to fluidly connect the appropriate ports to perform the current instruction.

The controller is also electrically connected to novel suction valves between the pool and the pump. The valves have bellowed interiors that can be opened and closed by electronic control using the advantage of pressure differentials between the interior and exterior of the bellows.

The controller also is electrically connected to a solenoid valve controlling the delivery of water from an external supply into the pool fill line. The controller also automatically determines maintenance needs (such as the need to backflush) based on water conditions (such as the pump pressure) at various points in the system.

As a result, the present pool maintenance system is completely capable of monitoring pool condition, including cleanliness of the filter, over full or under-full water levels, improper temperature, etc., and activate the necessary equipment to correct the problem, all without human intervention.

These and other advantages of the invention will be more completely understood and appreciated by carefully reading the following detailed description of the presently preferred exemplary embodiment of this invention when taken in conjunction with the accompanying drawings, of which:

DETAILED DESCRIPTION OF THE PRESENTLY PREFERRED EMBODIMENT

Figure 1:
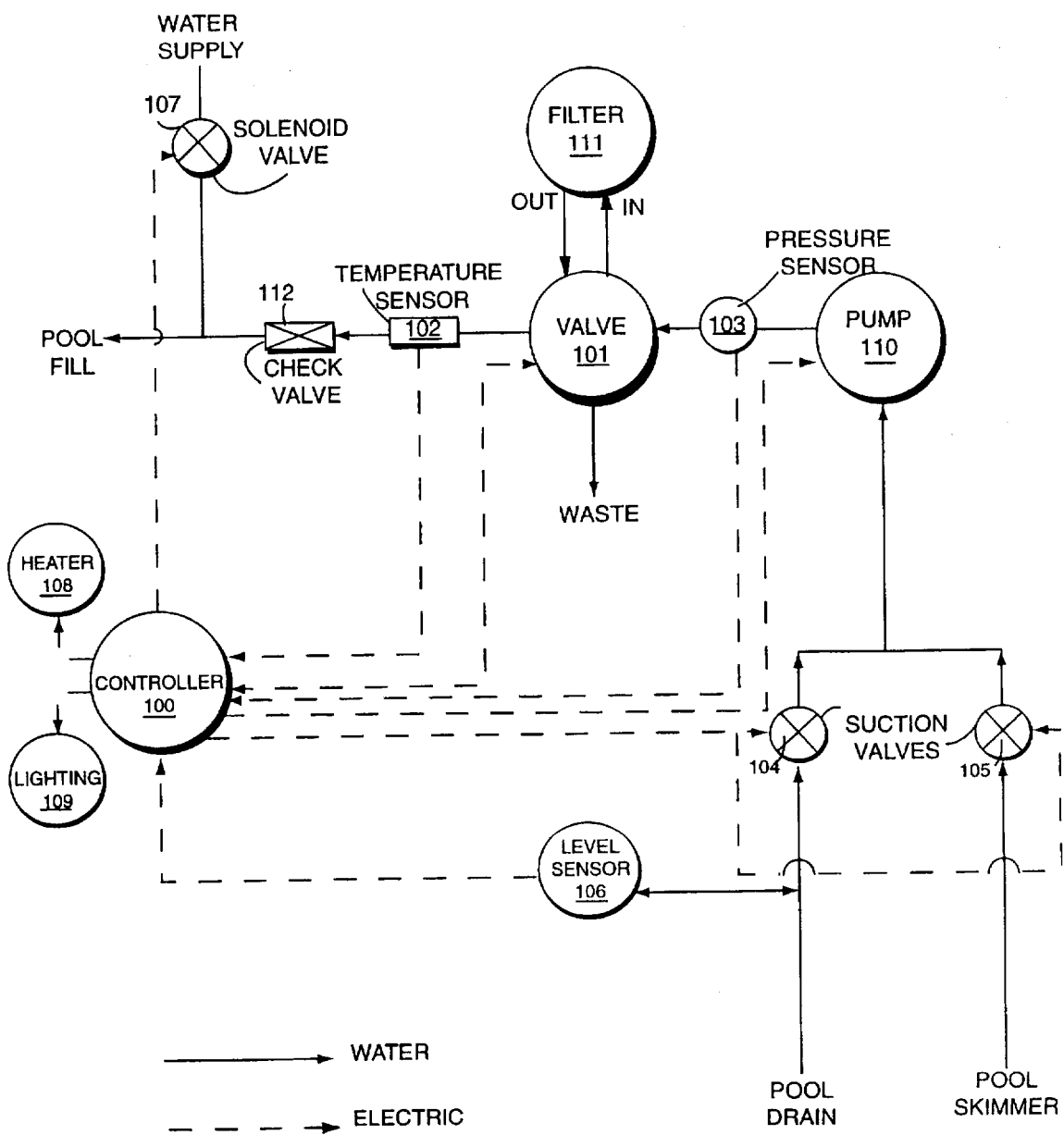
FIG. 1 is a schematic diagram of one embodiment of the present system.

The present system is a network of interacting pool maintenance components operating under the direction of a controller 100. As shown in FIG. 1, the controller 100 is electrically connected (either by hand-wiring, optical coupling, wireless communication, etc.) to communicate with a valve assembly 101, a temperature sensor 102, a pressure sensor 103, suction valves 104 and 105, water level sensor 106, solenoid valve 107, heater 108, and lighting 109. While the system described in FIG. 1 is presently preferred, the present invention need not include all of the components shown in FIG. 1, nor are additional components (such as automatic chlorinators, etc.) precluded.

The embodiment of FIG. 1 includes several fluid connections. The pool drain is connected to the level sensor 106 and the suction valve 104. The pool skimmer is connected to suction valve 105. The valves 104 and 105 output in parallel to the pump 110 at a low pressure input of the pump 110. The high pressure output of the pump 110 is fluidly connected to the valve assembly 101 at a high pressure input on the rotor of the valve 101 (described below). Between the pump 110 and valve assembly 101 is the pressure sensor 103 to report the pressure of the output of the pump 110 to the controller 100. The valve assembly 101 is fluidly connected to a waste line (such as a sewer line), to a filter 111, and to check valve 112. The valve assembly 101 is fluidly connected to the filter 111 by both filter input and filter output lines, as shown. Between the filter 111 and check valve 112 is the temperature sensor 102 to report to the controller the temperature of the water being output from the valve 101.

The check valve 112 is connected to the pool fill line, as shown. Also connected to the pool fill line via solenoid valve 107 is the external water supply line.

Figure 2:
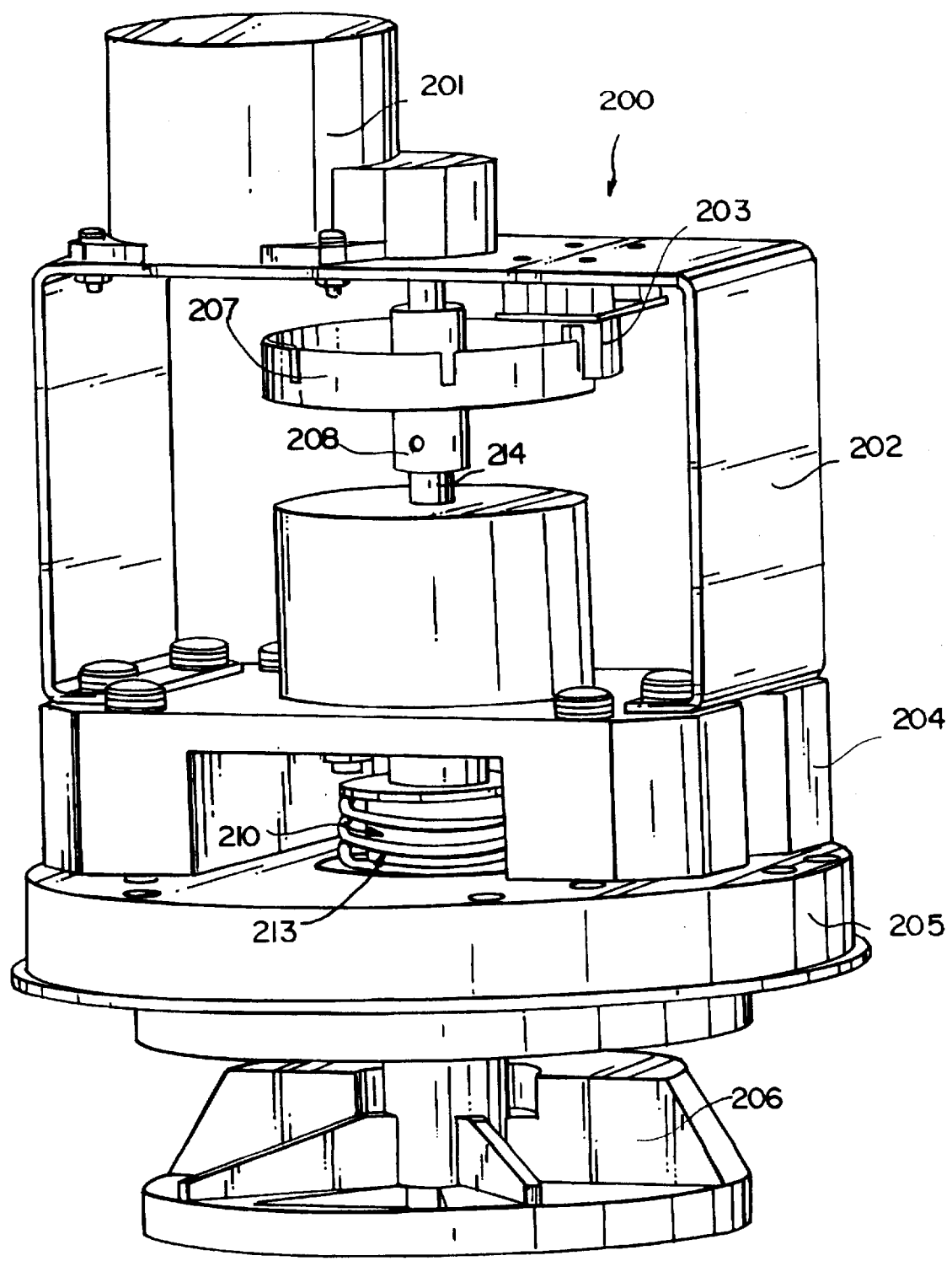
FIG. 2 is an isometric view of one embodiment of the actuator and rotor portions of the automatic valve component of the system of FIG. 1.
Figure 3:
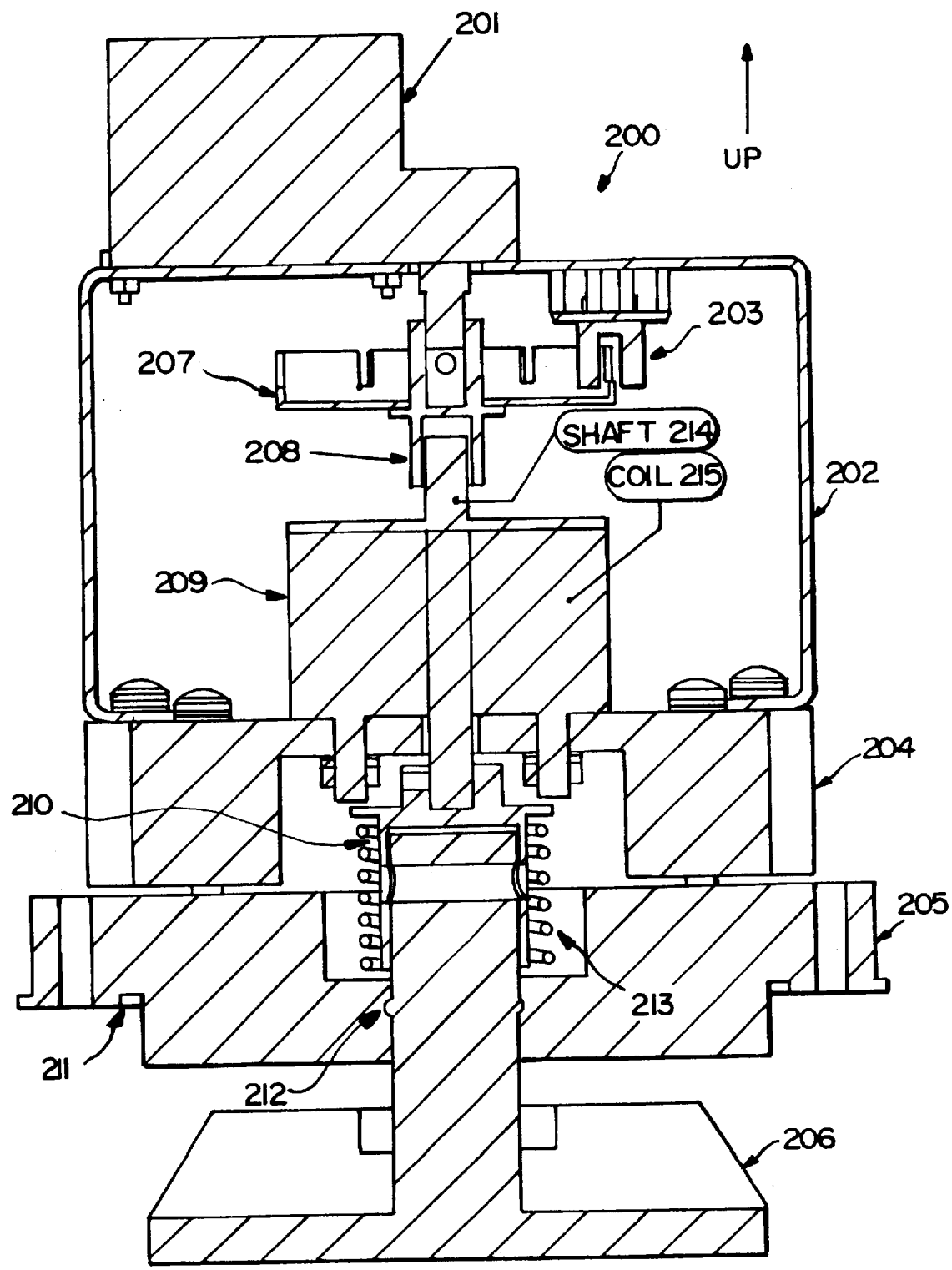
FIG. 3 is a section view of the actuator and rotor of FIG. 2.

The device illustrated in FIGS. 2 and 3 is the actuator portion 200 of the valve assembly 101. The actuator 200 includes gear motor 201, bracket 202, photo-sensors 203, mounting block 204, top plate 205, rotor 206, position disk 207, coupler 208, solenoid 209, top plate coupling 210, O-ring 211, O-ring 212, spring 213, shaft 214, and coil 215. The actuator 200 mounts onto a suitable valve body (such as FIG. 12) at top plate 205.

By incorporating the rotor 206 with the assembly shown and interfacing this assembly to a valve body (FIG. 12) by means of top plate 205, a servo valve with position feedback is created with six position capability. These positions are;

filter, waste, closed, backwash, recirculate and rinse. The microprocessor-based controller described below controls and switches the valve to the appropriate position required.

The actuator 200 mounts to the valve body (FIG. 12) by means of top plate 205. Sealing is accomplished by O-ring 211. Rotor 206 extends down into the valve body but does not contact the valve seat surface in the valve body since the force of spring 213 holds it off. The rotor may take the form of the rotor shown in U.S. Pat. No. 3,640,310, which matches the value body of FIG. 12. Other suitable rotors and valve bodies may be substituted instead.

O-ring 212 provides a sliding seal between rotor 206 and top plate 205. Coupling 210 connects rotor 206 to solenoid 209 which is mounted to mounting block 204 which attaches to top plate 205. The shaft 214 of solenoid 209 is free to rotate about its axis and translate up and down (relative to FIG. 3). The top of the solenoid shaft 214 is attached to coupler 208 in such a way as to allow relative movement of the solenoid shaft axially but not rotationally. The position disk 207 is then bonded to coupler 208.

Figure 4:
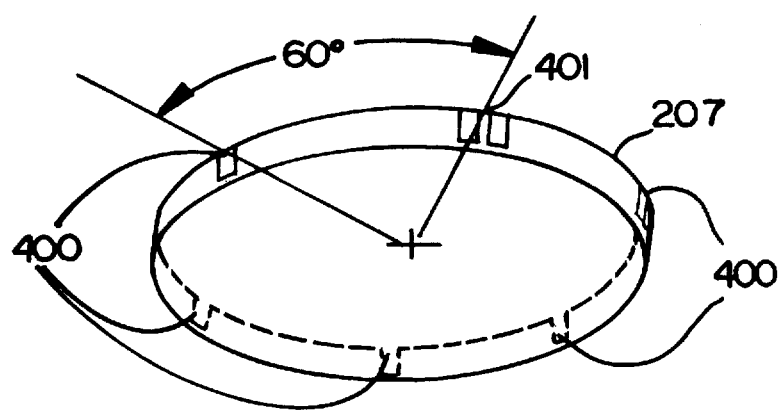
FIG. 4 is an isometric view of the position disk in the valve of FIGS. 2 and 3.

As shown in FIG. 4, the position disk 207 contains five single width slots 400 and one double width slot 401. In the embodiment of FIG. 4, the six slots are spaced 60° apart and coincide in a predetermined alignment with the six valve positions. In the present system, the present invention is limited neither to the 60° spacing nor to the six value position, provided the position of the values can be determined by the controller 100. The double width slot is aligned with the "filter" position of the valve.

The other end of coupler 208 attaches gear motor 201. Gear motor 201 mounts on bracket 202. Also mounted on bracket 202 are two side-by-side photo-sensors 203, each containing a transmitter and receiver. One photo sensor is mounted in each leg of the "U" shaped device (203). These photo-sensors 203 are located in such a way as to allow the slotted edge of position disk 207 to rotate between the transmitter and receiver of each sensor. When a slot is encountered, light from the transmitter reaches the receiver and a pulse is sent to the controller. The only time both photo-sensors 203 send a pulse at the same time is when the double slot is encountered, at which time the controller knows it is in the filter position or "home base."

The valve is initially de-energized and rotor 206 is held in the up position off the valve seat by spring 213 which in turn forces the solenoid shaft upwards (with coupler 208 allowing axial translation of the solenoid shaft but not rotational, as stated previously). In operation, the automatic valve begins in the "home base" position, which corresponds to the filter operation. Solenoid 209 is then energized, forcing the solenoid shaft 214 and rotor 206 downward (relative to FIG. 2 and 3). Rotor 206 comes to rest on the valve seat of the valve (FIG. 12) and the controller checks the photo-sensors 203. When the valve is in the filter position, the controller reads a signal from both photo-sensors due to the double width slot in the position disk 207 being aligned with the photo-sensors 203. In this position, the controller thus verifies that the valve is in the filter position.

The pump 110 (FIG. 1 ) then pumps water from the pool drain and skimmer through the suction valves 104 and 105 into the valve assembly 101, in accordance with the operation described below with respect to FIG. 11. The pump 110 connects to the valve assembly 101 through a lower valve body of the actuator 200. Since the rotor 206 of the valve assembly 101 has been placed in the "filter" position, the water pumped into the valve assembly 101 is directed to the "filter in" line of the filter 111 and ultimately into the filter 111. There, the water is filtered and directed through the "filter out" line into the valve 101 where it exits through check valve 112 into the pool via the "pool fill" line. It should be noted that the particular method by which the valve receives the pump water and delivers it to the filter is not critical provided a suitable rotor is included to be operated by the actuator 200 under the automatic control of controller 100, without human intervention.

When a new position is desired, the controller solenoid 209 is de-energized and spring 213 forces rotor 206 up off the valve seat and forces the solenoid shaft upward. Gear motor 201 is now energized and begins to turn position disk 207, the solenoid shaft 214 and the rotor 206 clockwise. While turning, the single width slots in position disk 207 pass by the photo-sensors 203 and one pulse is read and counted each time a slot does so.

The controller counts the passing slots 400 until the desired position is reached at which time the gear motor 201 is de-energized and the solenoid 209 is energized simultaneously. This forces the solenoid shaft and rotor 206 down, bringing rotor 206 to rest on the valve seat in the desired position. Solenoid 209 then remains energized during water flow in the valve to prevent water pressure from forcing rotor 206 off the valve seat. (Solenoid 209 is a small displacement, high force (100 lb.+) device). When a new position is desired, the process is repeated. Each time the double width slot is encountered by the photo-sensors 203, the controller counter is re-set to zero.

When the pool is too full, the controller 100 determines the condition by the water level sensor (described below) and directs the valve assembly 101 to lift the rotor 206 from the valve body by de-activating the solenoid 209, rotating the rotor 206 by the gear motor 201, and counting the number of pulses generated by the photo-sensors 203 until the position disk 207 indicates that the rotor is in the "waste" position. The solenoid 209 is then re-activated, forcing the rotor 206 onto the valve body. Pump 110 then pumps water from the pool skimmer linen through suction valve 105 into valve assembly 101 which purges the water through the "waste" line.

In still another example, the controller 100 can detect the need to backwash the filter 111 by detecting particular high pressure conditions from the pressure sensor 103. At that point, the controller 100 signals the valve assembly 101 to lift, rotate and replace the rotor onto the valve body in order to connect the pump 110 to the "filter out" line such that water from the pool drain is flushed backwards through the filter 111 and exits the "filter in" line back into the valve assembly 101 where it is purged through the "waste" line.

Figure 5:
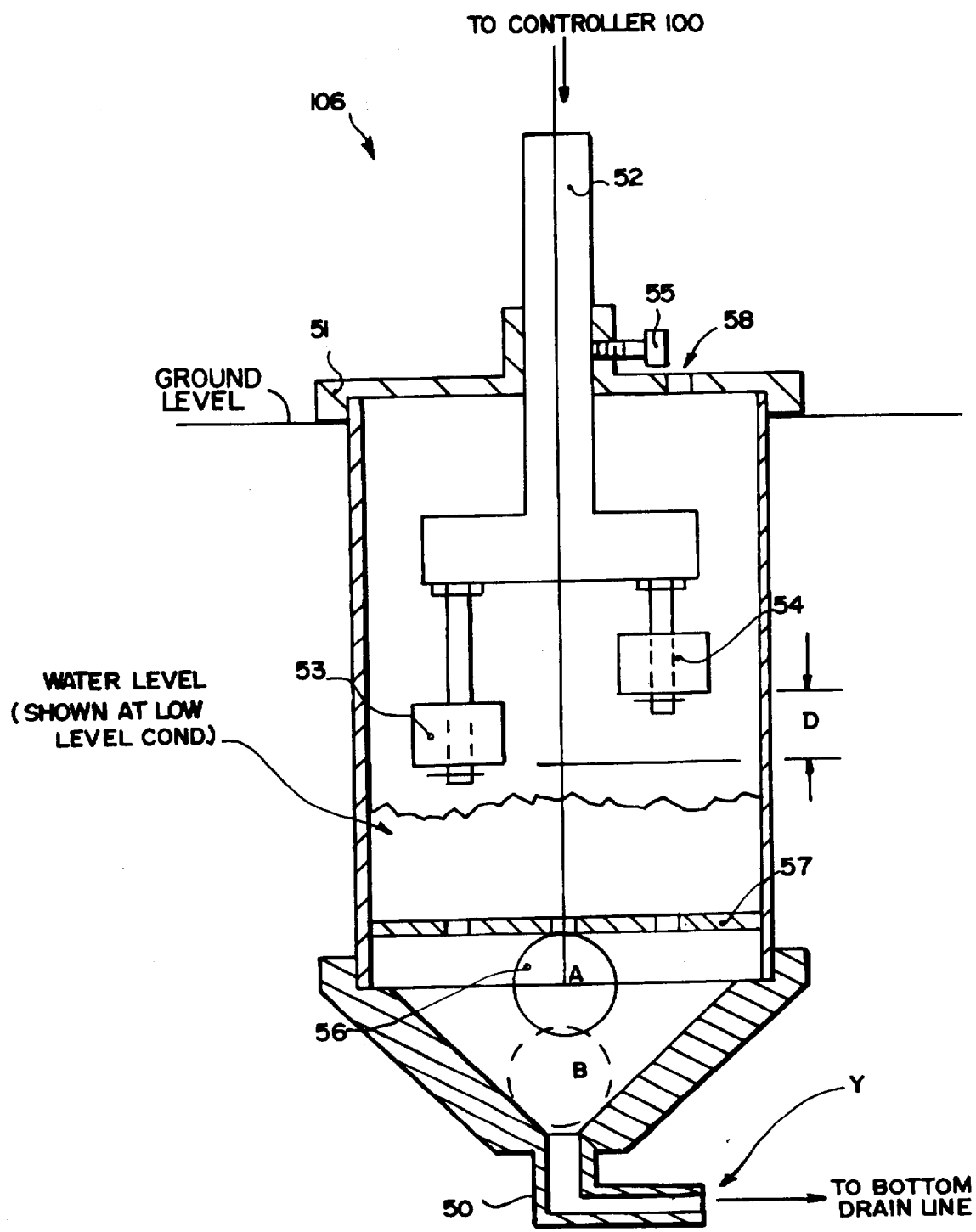
FIG. 5 is a section view of one embodiment of the water level sensor component of the system of FIG. 1.

The water level sensor is a component of the present automated swimming pool control system that senses both high and low water level in the swimming pool and reports these conditions to the controller 100. It is remotely located away from the swimming pool itself, but is attached by flexible tubing 50 to the pool bottom drain line. The sensor includes a chamber 51 that is placed below ground level, as shown in FIG. 5. When the pool bottom drain line is not in operation, water from the pool will enter at point "Y" and fill chamber 51 until the float ball 56 begins to float and comes to rest against the ball retainer plate 57 (moving from position B to position A). As the water continues to rise, it passes through holes in the ball retainer plate 57, forcing air out of the vent hole 58. The water will stop rising when it is at an equal level with that of the pool. The float switch mount 52 can then be adjusted up or down by releasing lock screw 55 to correct the location of the reed switches 53 and 54. The adjustment is correct when the normally closed magnetic reed float switch 53 starts to float upward and opens. This switch 53 is the low level switch which controls water flow to the pool from the supply. When the switch is closed, water flows to the pool; when it is open water ceases flowing to the pool.

When the system is at equilibrium, nothing in the water level sensor occurs. That is, if the water level is between the switches 53 and 54, the pool level is within a preferred range and the system makes no adjustments to it. It should be noted that the level sensor unit is only in operation when the swimming pool bottom drain line is not in operation.

If the water level in the pool rises (for example, due to rain), the water level in chamber 51 will rise until the normally open magnetic reed float switch 54 starts to float and closes. Switch 54 is the high level switch and when closed causes the pool to drain. As the pool drains, the water level in housing 1 lowers and float switch 54 moves down and opens, causing the draining operation to cease-the system is once again at equilibrium. As the pool loses water (due to evaporation, leakage, etc.), the water level in chamber 51 goes down until the low level float switch 53 moves down and closes, thus letting supply water into the pool. As the pool level rises, the water level in chamber 51 rises causing switch 53 to open and filling of the pool ceases, with the system again in equilibrium. The pool level is maintained within a tolerance zone which is dimensionally equal to distance "D" in FIG. 5, which will vary depending on pool dimensions and conditions, but is preferably in the range of 0.5 to 0.75 inches.

By the above process, due to the fact that the level sensor unit is remotely located away from the pool, it is insensitive to surface turbulence in the pool caused by swimmers, etc. and thus does not try to compensate for false water levels.

In the event that the bottom drain line is switched on, the level sensor unit is automatically switched off. Under this condition, a negative pressure in the drain line causes water to be drawn out of chamber 51 until the water level drops sufficiently to allow float ball 56 to move from position "A" to "B," thereby sealing off exit port "Y." This prevents air from being drawn in through vent hole 58 and into the pool bottom drain line that would otherwise cause cavitation of the pool pump.

Integration of the water level sensor 106 of FIG. 5 as a part of the complete automated pool system can now be appreciated with reference again to FIG. 1. When the water level sensor 106 detects a low water condition by operation of the reed switch 53 (FIG. 5), the water level sensor 106 reports the low water level condition to the controller 100 via the electric signal line between the level sensor 106 and the controller 100. The controller 100 responds by opening the solenoid valve 107, thereby filling the pool via the "pool fill" line from the "water supply" line. Check valve 112 prevents water from the water supply line from entering the valve assembly 101.

Figure 12:
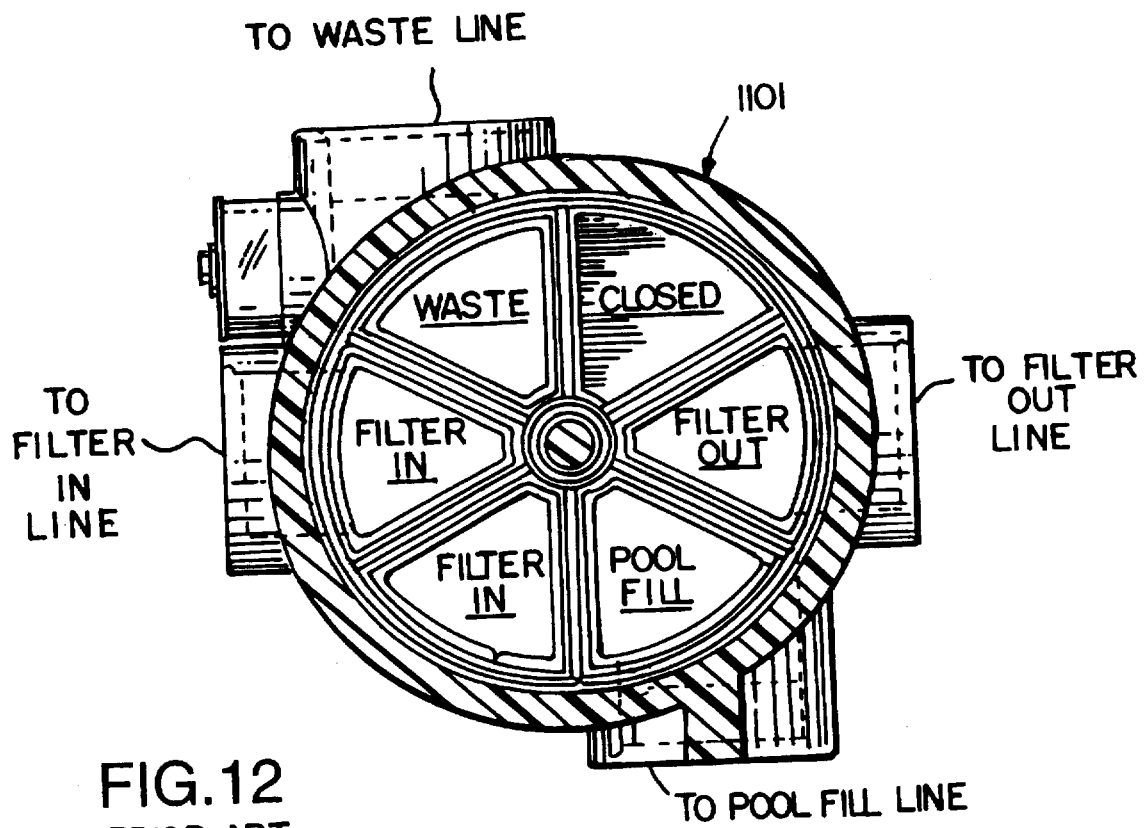
FIG. 12 is a prior art valve body.

Then, when the water level sensor 106 (FIG. 5) detects a high water level condition via the reed switch 54, the water level sensor 106 notifies the controller 100 of the over-full condition. The controller 100 responds by directing the valve assembly 101 to de-energize the solenoid 209 (FIG. 3), thereby lifting the rotor 206 off of the valve body (FIG. 12) by the force of the spring 213. The controller 100 then activates the gear motor 201 to rotate the rotor 206 to a position where the rotor 206 aligns its high pressure input port to the "waste" port of the valve body (FIG. 12). The position is detected by the controller 100 by its detection and counting of the slots 400/401 in the position disk 207 as detected by the photo-sensors 203, as described above. The controller 100 then directs the valve assembly 101 to energize the solenoid 209, thereby forcing the rotor 206 onto the valve body. The pump 110 (FIG. 1 ) then pumps water from the pool drain through the suction valve 104 into the valve assembly 101 where it is purged through the "waste" line.

Figure 6:
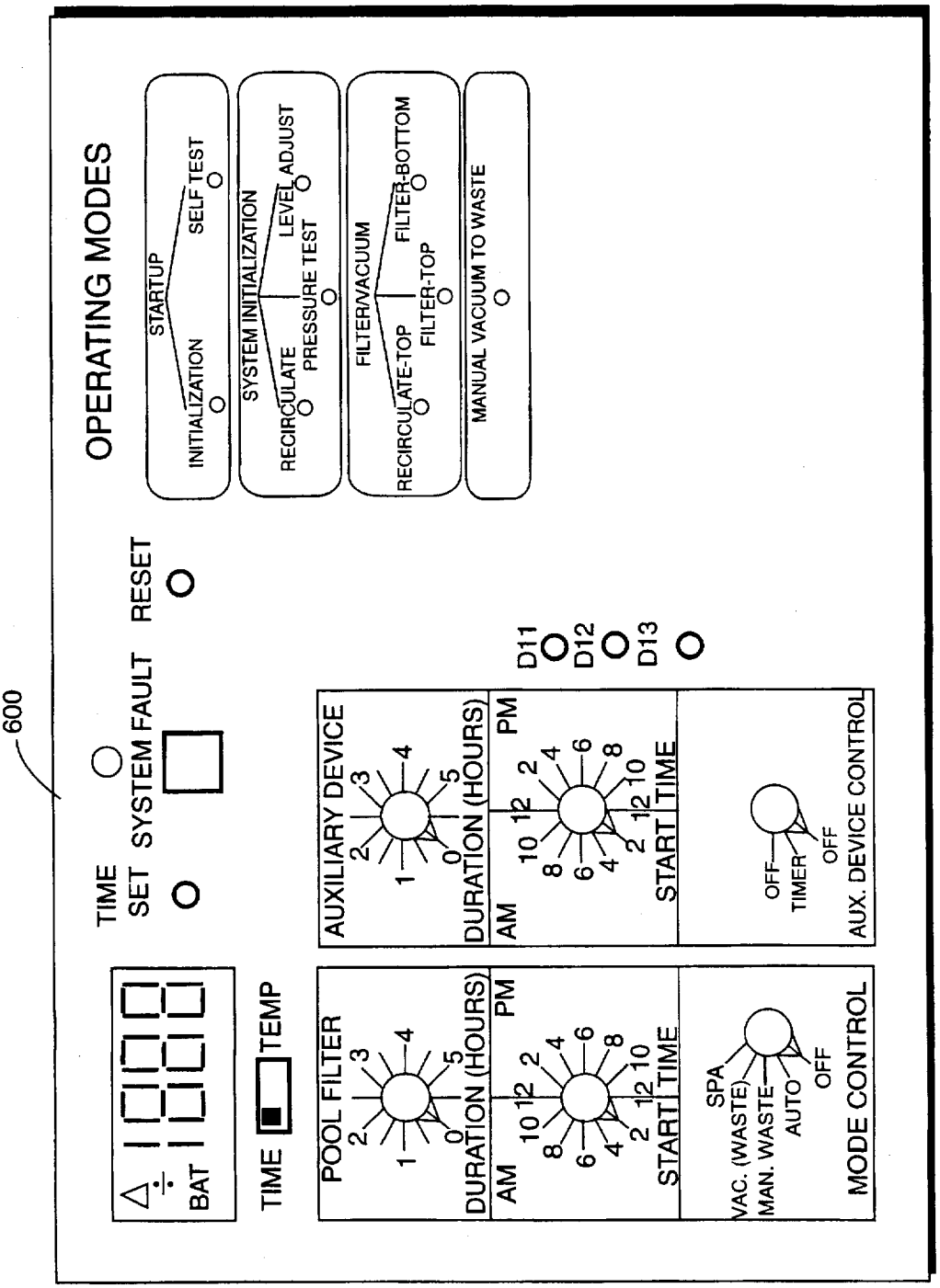
FIG. 6 is a front view of one embodiment of the front panel of the controller component of FIG. 1.

The operation of the controller 100 will now be described with particular reference to FIGS. 6-10. In FIG. 6, the front control plate 600 of the controller is shown. Various settings are provided to optimize the system for a particular pool. Specifically, the duration in which pool filtering will occur, for example, from 0-5 hours, can be set. The user also sets the operation start time during which automated operation of the pool maintenance system will begin. In addition, the various modes of operation of the controller may also be set, including "off" (in which the controller is de-activated), "auto" (in which the normal pool maintenance automatic functions described above and below are performed), "manual vacuum" (in which the controller coordinates a manual vacuuming of the pool), "waste vacuuming" (in which the pool is vacuumed with a purging operation), and a "spa" operation (in which the controller automatically controls the maintenance of a spa rather than a pool).

Settings are also provided for control of an auxiliary device such as a heater 108 or lighting 109. Various other auxiliary devices may be used and controlled by the controller with the duration, start time, and mode operations being set by the appropriate controls on the face of the controller.

On the far right column of the face of the controller panel (FIG. 6) is a set of indicator lights identifying to the user which modes the controller is presently operating in. In the top left corner, a time and temperature display is provided. At the top of the controller, a warning light ("system fault") provides the user with a visual warning when the controller detects an unusual condition.

Figure 7:
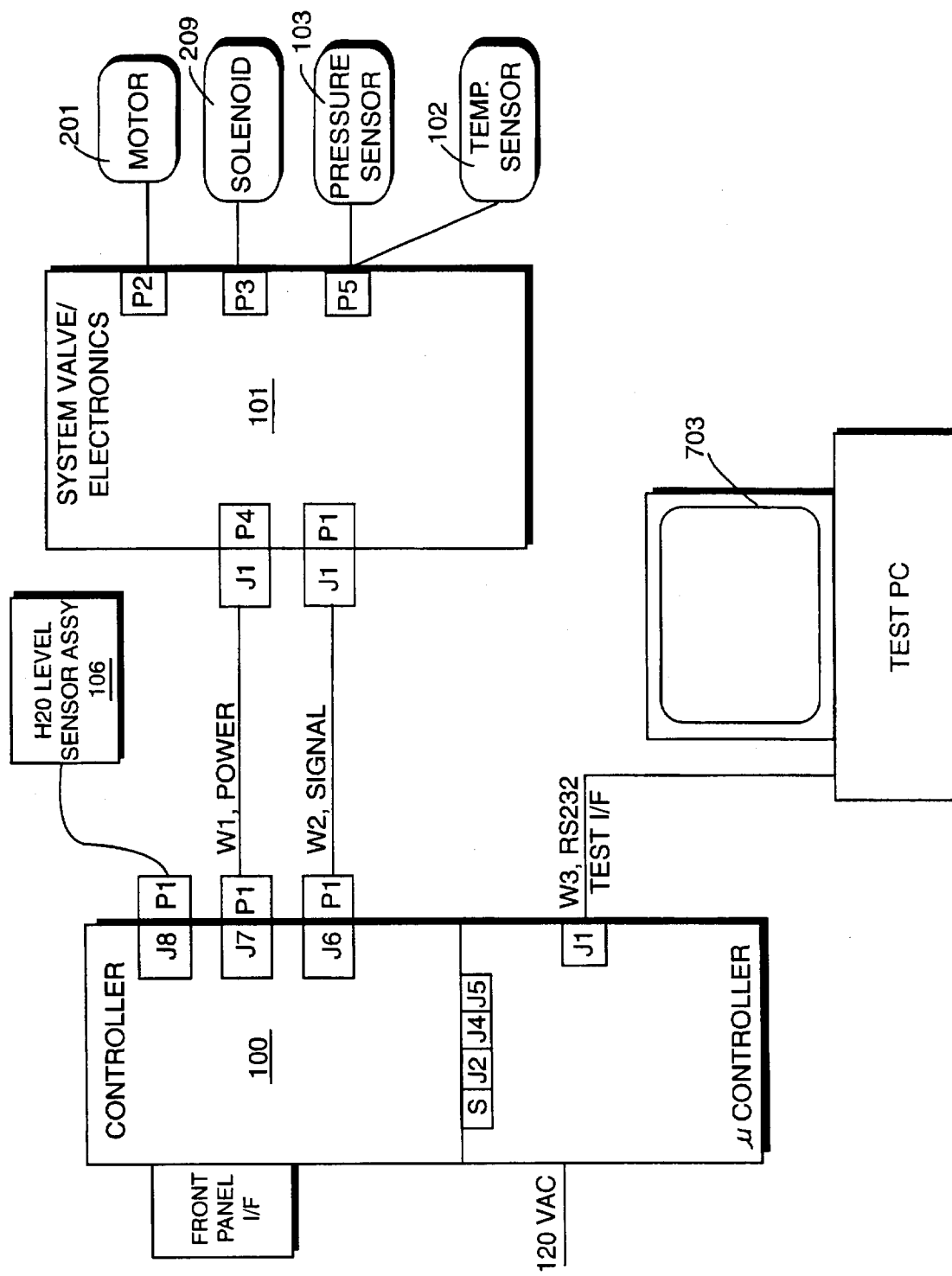
FIG. 7 is an interconnect diagram of one embodiment of the controller, sensor, and motor components in the system of FIG. 1.

In FIG. 7, the various electrical connections between the controller 100, the water level sensor 106, the valve assembly 101, the pressure sensor 103, and the temperature sensor 102 are shown. In particular, the controller 100 is electrically connected to the water level sensor 106 via a signal line that the water level sensor uses to indicate high water and low water conditions to the controller 100. A controller 100 is also connected to the valve assembly 101 by power and signal lines which the controller 100 uses to control the operation of the rotor 206 on the valve body, thereby controlling the functions performed by the valve assembly 101 described above. The valve assembly 101 is electrically and mechanically connected to receive signals from the motor 201 and solenoid 209 which control the rotation of the shaft 214 (FIGS. 2 and 3) which ultimately control the rotation of the rotor 206 relative to the valve body (FIG. 12). The valve assembly 101 is also electrically connected to the pressure sensor 103 and the temperature sensor 102, which signals are reported back to the controller 100 for determination regarding the need for a backflush operation, a suction operation, or increases/decreases in water temperature, as are described more fully below. The controller 100 should also have a plug connection for a test PC 703, which is used to test and diagnose the operation of the controller 100 and its various pool components.

Figure 8:
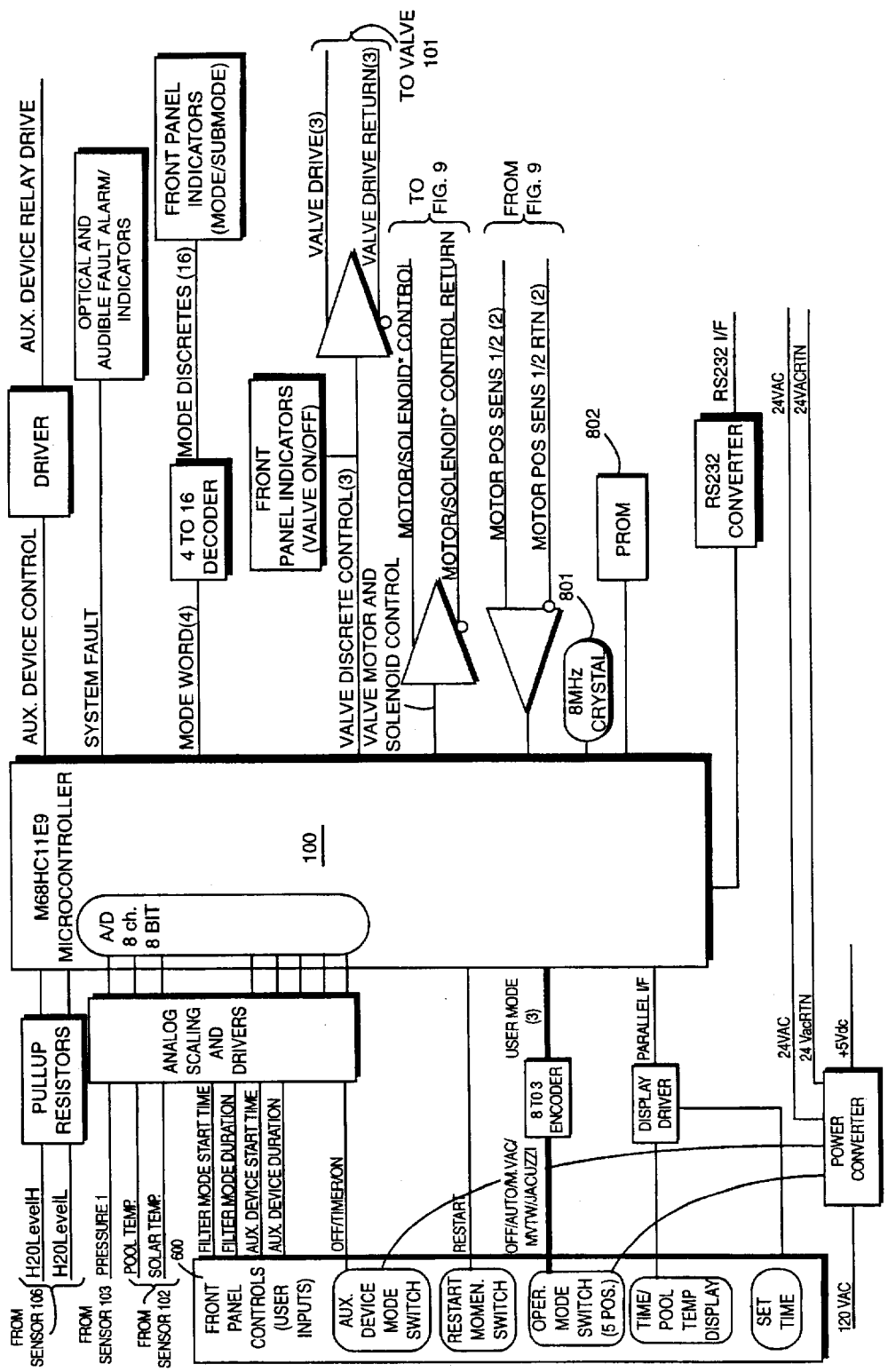
FIG. 8 is a block diagram of the controller in the system of FIG. 1.

The electrical connection of the controller 100 is shown in more detail in FIG. 8. In the middle of FIG. 8 is the controller 100 which may be a "68" class micro controller. The controller 100 receives a high water level signal "H2O Level H" and a low water level signal "H2O Level L" signal from the water level sensor 106. The signals are used by the controller to react to over-full and under-full pool water level conditions.

From sensor 103, the pressure of the water exiting the pump 110 (FIG. 1) is determined and reported to the controller 100. This pressure signal ("pressure 1") is used by the controller 100 is determine a high pressure condition (indicating that the filter 111 needs to be backwashed), thus prompting the controller 100 to direct the valve assembly 101 into the backwash procedure. When a low pressure condition is determined, the controller opens suction valve 104 and closes valve 105 to protect the pump from possible air leakage or blockage in the input line to the pump 110.

Temperature sensor 102 provides the controller 100 with a signal indicating a pool temperature ("Pool Temp.") and the external air temperature ("Solar Temp."). The controller 100 uses these signals to activate the heater 108 to control the temperature of the pool water.

The front panel 600 of the controller, described above in reference to FIG. 6, also provides various signals to the controller 100 indicating filter start times, filter duration times, operation modes, etc., as described above with respect to FIG. 6.

The controller 100 outputs an auxiliary device control signal "Aux. Device Control" which activates any auxiliary device that may be included in the pool maintenance system. The controller 100 also includes a "System Fault" signal connected to the system fault indicator on the front panel of the controller (FIG. 6) which indicates to the user when the controller 100 senses an abnormal condition. The specific mode indicator will remain illuminated to provide the operator with the fault mode indication. The controller 100 also operates the indicator lights on the front panel of the controller (FIG. 6). Specifically, when the operator chooses a mode from the "mode control" on the front panel 600 of the controller of FIG. 6, such as "off," "auto," etc., the controller 100 takes a signal from the five position switch, and encodes it into a three bit word called "user mode (3)." The controller 100 then indicates on the indicator lights which operation is occurring within the mode by outputting a four-bit word ("mode word (4)") to a decoder that outputs 16-bits, nine of which correspond to the nine indicator lights shown on the right side of the panel 600 of FIG. 6.

Controller 100 communicates with the valve assembly 101 via the two-directional line "Valve Discrete Control (3)." The controller 100 also communicates with the motor 201 that drives the valve assembly 101 by the line "Valve Motor/Solenoid Control." The position of the rotor 206 is communicated to the controller 100 from the sensors 203 by the "Motor Pos Sens ½ (2)" line. Operation of the controller 100 is clocked by crystal 801. Program memory providing the instructions for operating the pool maintenance system are loaded in PROM 802 for the controller 100.

Figure 9:
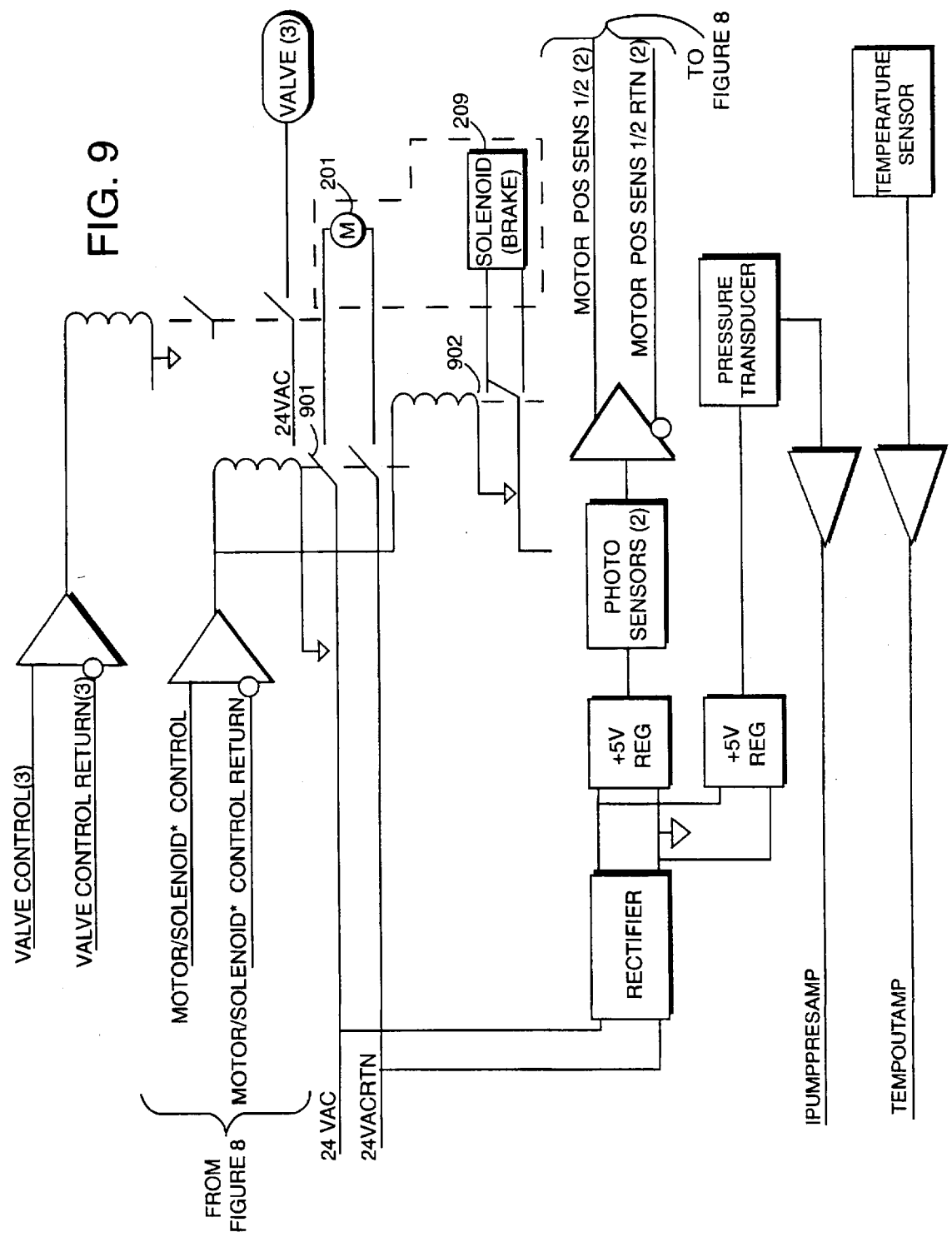
FIG. 9 is a block diagram of the circuitry controlling the motoring and braking of the valve of FIGS. 2–3.

The control circuitry is continued on FIG. 9 where the Motor/ Solenoid Control lines are shown being received from the diagram of FIG. 8 and the "Motor Pos Sens ½"" signals are shown returning to the schematic of FIG. 8. In particular, the Motor/Solenoid Control signals from the controller 100 control the operation of switch 901 (which is normally open) and switch 902. When switch 901 is open, motor "M" 201 does not receive power and thus does not rotate. Meanwhile, solenoid 209 is activated by switch 902, thus holding the motor "M" 201 stationary. When the appropriate control signal is received by the "Motor/ Solenoid Control" line, switch 901 closes, applying power to the motor M. Simultaneously, switch 902 closes, releasing the "brake" from the motor. The application of power to the motor "M" and the release of the "brake" causes the motor 201 to rotate the rotor 206, causing the photo-sensors 203 to begin counting the passage of slots in the position disk 207 as it rotates.

These counts are delivered to the controller 100 by the photo-sensors 203 along the "Motor Pos Sens ½ lines, which the controller uses to count the number of openings that have passed the photo-sensors 203 by the position disk 207, indicating the position of the rotor 206. When the controller 100 recognizes an appropriate number of counts from the photo-sensors 203, indicating that the rotor 206 is in proper position, the controller 100 sends a control signal to the switches 901 and 902 by the "Motor/Solenoid Control" lines to remove the application of power to the motor "M" and to apply the "brake" to solenoid 209 to cease rotation of the rotor 206 and brake the rotor 206 in place.

IPUMPRESAMP signal in the input pressure signal received from the pressure transducer that is used, as described below, to test for high and low pressure conditions.

Figure 10:
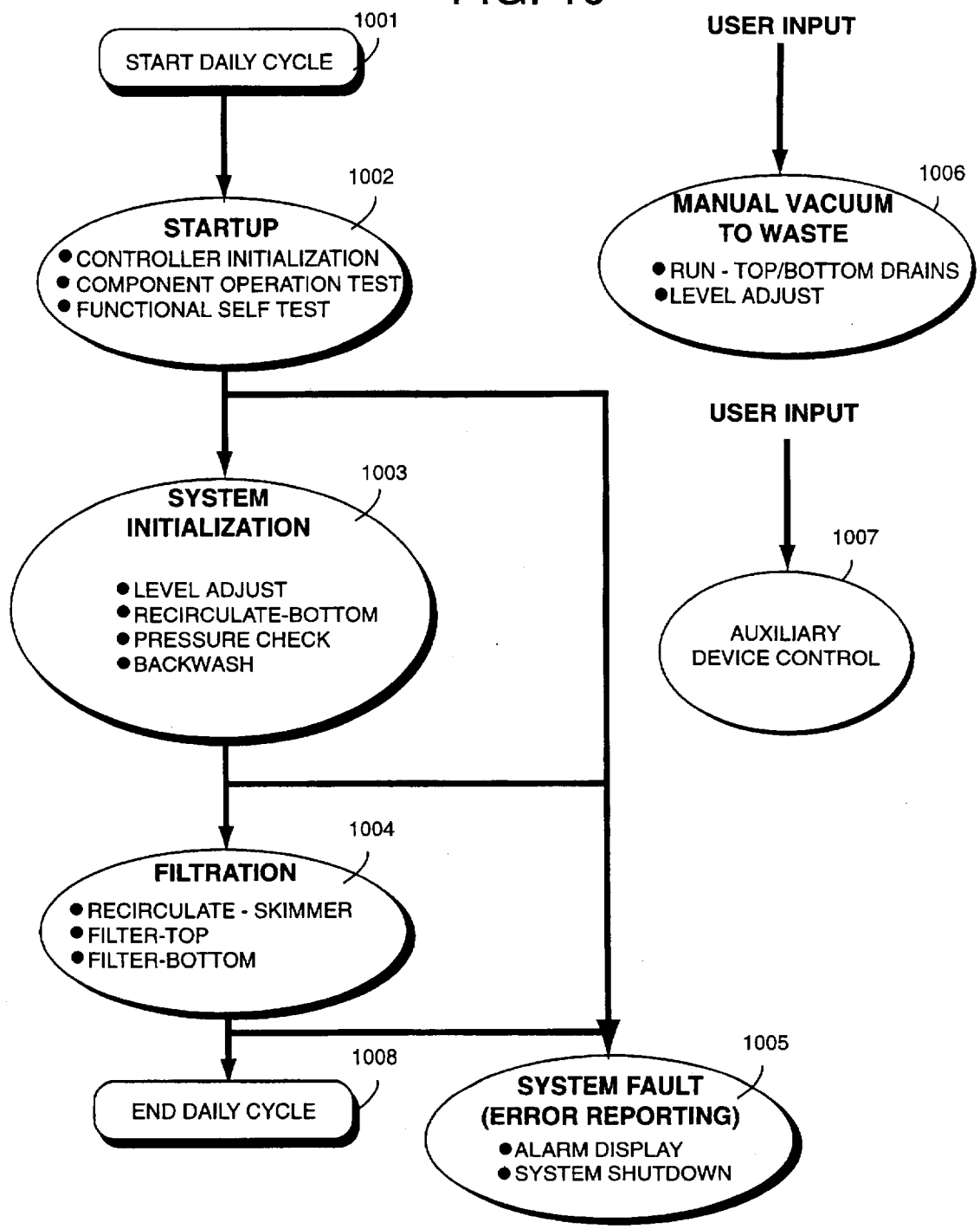
FIG. 10 is a flow diagram of the operational modes of the system.

With reference to FIG. 10, the standard operation of the pool maintenance system is described.

The functional flow diagram is outlined in FIG. 10. At step 1001, the controller 100 is initialized by the user to activate at a specified starting time and for a specified filter duration. At the specified start-up time 1002, the controller 100 enters a diagnostic mode that checks the operation of system components and performs a system level functional test. Next, at step 1003, the controller 100 samples the water level sensor 106 for high or low water level conditions. The controller remedies a high level condition by activating the pump 110 and actuator 200 to waste water, or a low level condition by activating the solenoid valve 107 to add water from the water supply. The controller 100 then verifies that the water level is at the desired point.

Once the water level is adjusted, the controller 100 then samples the pump discharge pressure by pressure sensor 103 to determine the need for a filter backwash (high pressure condition or problems on the suction side such as air leakage in the system, a clogged skimmer basket, or clogged pool sweep (low pressure condition. The particular thresholds for the high and low pressure conditions are not critical aspects of the present invention will vary depending on, for example, the size and type of filter and pump used. These thresholds can be terminated by inspection of a particular pool system. If any of the low pressure conditions are detected, the bottom suction valve 104 is opened and 105 closed in order to protect the pump 110 and still allow the maintenance function to occur at a reduced level of affectivity. In addition, at step 1005, an audio/visual alert (FIG. 6) is activated to provide the user feedback information on problems with the system.

Having completed the diagnostic mode, the system enters the filtering mode at step 1004. During this mode, the controller 100 periodically samples the pool conditions to assure continued safe system operations. The system is automatically shut down by the controller 100 after filtering for the pre-set length of time.

The normal daily cycle ends at step 1008.

Additional features of the system allow the water temperature to be continuously displayed, and for the auxiliary equipment to be controlled independent of the pool filtering mode (step 1007). These all occur at the user's command.

The design of the controller 100 allows any of these modes to be interrupted by the user at any time. In manual mode the pump servo valve and suction line valves are still completely controlled by the controller 100, but at the discretion of the user. At step 1006, this function allows the controller 100 to assist the user in performing manually initiated tasks such as vacuuming, backwashing, and adjusting the water level above/below normal.

Figure 11:
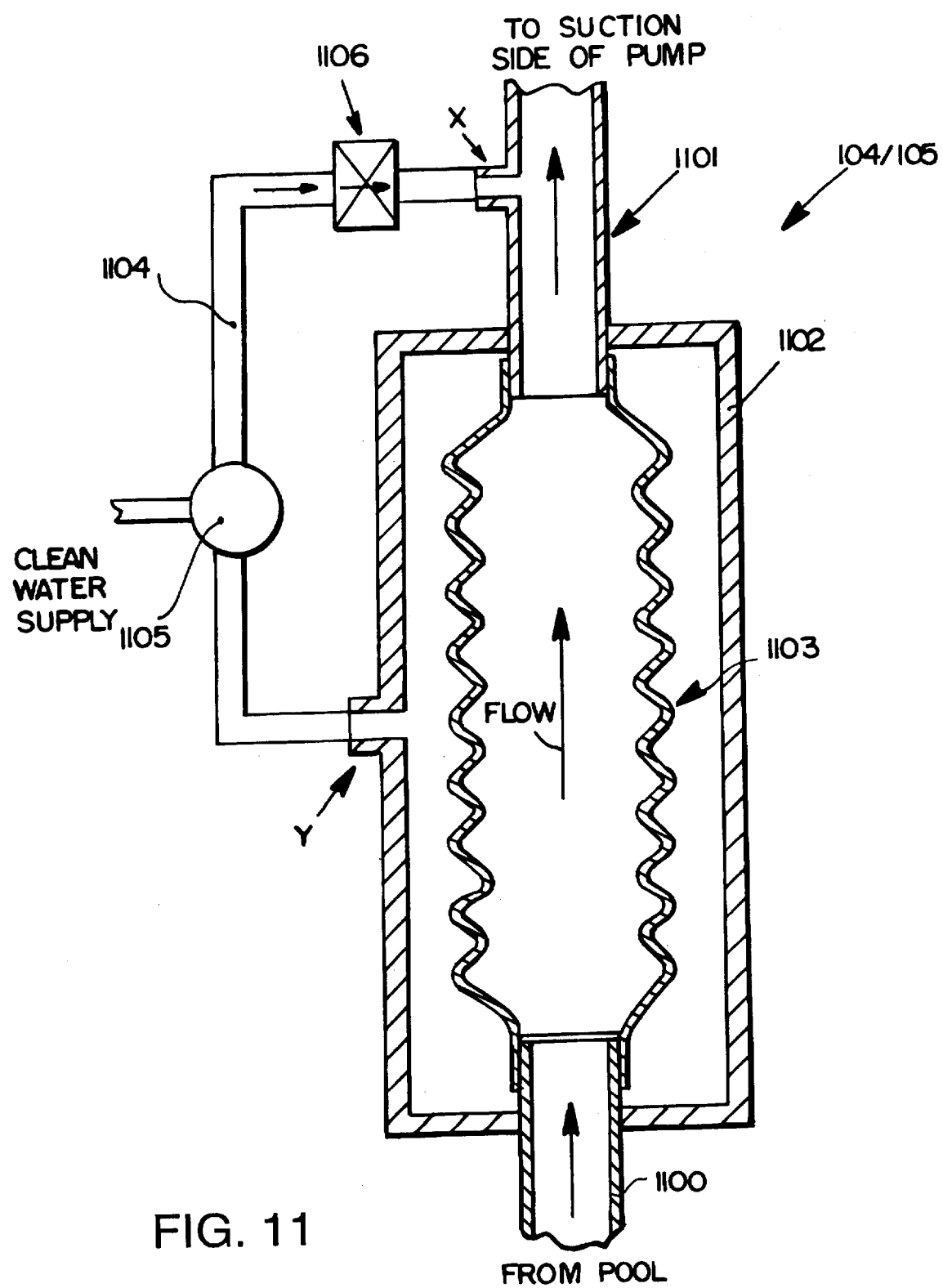
FIG. 11 is an exemplary suction valve of the present invention.

An example suction valve 104/105 is shown in FIG. 11. The suction valve shown in FIG. 11 is another component of the swimming pool control system that works automatically and in synergy with the other, previously is described system components. Two identical valves 104 and 105 (FIG. 1) are used in parallel in the system. These control the bottom drain line and skimmer line by closing one or the other or both lines during appropriate conditions.

The suction valve is composed of the suction line 1101, housing 1102, elastomeric bellows 1103, tube 1104, 3-way sub-miniature solenoid valve 1105, and check valve 1106.

The valves 104 and 105 are shown in FIG. 1 in the same general orientation shown in FIG. 12. That is, the pool drain/skimmer connects to the valve 104/105 at the pool line 1100 near the bottom of FIG. 11 and the pump 110 connects to the valve at the suction line 1101 near the top of FIG. 11.

In the suction valve 104/105, the pool line 1100 and suction line 1101 are joined by the intermediary elastomeric bellows 1103 inside the housing 1102. Under certain conditions discussed below, fluid flow occurs from the pool line 1100 through the bellows 1103 to the suction line 1101 and to the pump 110. Fluidly connecting the suction line 1101 to the interior of the housing 1103 is a tube 1104 in series with a check valve 1106 and a solenoid valve 1105. The solenoid valve 1105 also connects to a clean water source, thus allowing clean water to enter the tube 1104 through the control of the solenoid valve 1105.

The operation of the valve 104/105 follows. When the system controller 100 needs the suction valve 104/105 to be open (flow through the bottom drain or skimmer) it activates solenoid valve 1105 to 1) connect ports X and Y by means of tube 1104 and 2) close the clean water supply from the tube 1104. Inside housing 1102 and on the outside of bellows 1103 is clean water. Pool water, containing debris, is inside pool line 1100, suction line 1101, and bellows 1103.

The pool pump is then switched on. Since the suction valve 104/105 is on the suction side of the pump 110, the pressure in suction line 1101 becomes negative which tends to make the bellows 1103 collapse, but at the same time a small amount of flow occurs in tube 1104, in the direction shown, of the clean water contained within housing 1102 until the pressure in housing 1102 and in suction link 1101 are equalized. This, in turn, equalizes the pressure between the inside and outside of bellows 1103 thus preventing it from collapsing. The bellows while open allows pool water to flow towards the pump without creating a pressure drop. This straight-through design also allows relatively large debris to pass through without clogging.

When the controller 100 then needs the suction valve 104/105 to be closed, (no flow from bottom or skimmer), it turns off pool pump 110 and it activates 3-way solenoid valve 1105 to close the line 1104 to port "X" and connects the clean water supply to port "Y." This allows clean water to flow into housing 1102. Since there is no flow or pressure in suction line 1101 or bellows 1103, and since the clean water supply has a 20 to 40 psi pressure which it exerts on the outside of bellows 1103, the bellows 1103 collapses.

Then, when the pool pump is turned back on, the pressure in suction line 1101 and inside bellows 1103 becomes negative creating even a greater differential pressure between the inside and outside of bellows 1103, causing it to collapse even tighter. The length of bellows 1103 is chosen such that, even if debris is within it when it collapses, it will form around the debris and still prevent flow.

When the controller 100 then wants to again open the suction valve, it turns off the pool pump 110 and activates 3-way solenoid valve 1105. This connects ports "X" and "Y" and closes the clean water supply. With no pressure now in suction line 1101 or bellows 1103, the natural resilience of the bellows 1103 makes it want to go back to its uncollapsed form, thereby forcing clean water out of housing 1102 through port "Y", 3-way solenoid valve 1105, tube 1104, check valve 1106, port "X", and into suction line 1101. Check valve 1106 prevents flow of pool water back through tube 1104 thereby keeping debris out of solenoid valve 1105 and housing 1102. The suction valve 104/105 is now in the "open" condition and when the pool pump is turned on, the suction valve remains open due to the conditions described previously.

In an alternative embodiment, the clean water port could be simply an atmospheric pressure port and the spring back of the bellows could be adjusted so it would collapse with just the differential pressure between atmosphere and the inside of suction line 1101 when the pump 110 is on.

In still another alternative embodiment, housing 1102 is transparent to allow visual inspection of the valve action.

This particular valve design is advantageous for a number of reasons. First, it can be reliably controlled by an automatic system controller, thus keeping with the requirements of the present invention of minimizing human intervention required during pool maintenance. In addition, the components of the valve 104/105 are relatively inexpensive. The present suction valve is, for example, cheaper than a motor operated globe valve which would give similar performance. In addition, no debris from line 1100 gets outside of lines 1100, 1101, or bellows 1103 to clog other components of the suction valve 104/105. The sub-miniature 3-way solenoid valve 1105 is an inexpensive plastic component, as is the check valve 1106. In addition, the bellows causes virtually no pressure drop between the suction line 1101 and pool line 1100. When the valve 104/105 is closed, the bellows seals despite the presence of debris.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An automated pool maintenance system for use with a water supply line, a water waste line, a pool fill line, and a pool drain line, comprising:

a pump for fluid communication with said pool drain line;

a filter having a filter input port and a filter output port;

a multi-port valve body having, a first port for fluid communication with the filter input port, a second port for fluid communication with the filter output port, a third port for fluid communication with the water waste line, and a fourth port for fluid communication with the pool fill line, an actuator connected to the multi-port valve body to control fluid connection between said valve body ports, the actuator including:

a rotor arranged adjacent to the valve body, and having a high pressure input for fluid communication with the pump and also having a low pressure output, and rotating relative to the valve body to select a fluid flow condition originating at at least a first selected port of the valve body and continuing through at least a second selected port of the valve body by aligning the high pressure input to the first selected port and the low pressure output to the second selected port;

a biasing mechanism applying a force on said rotor tending to disengage the rotor away from the valve body;

a solenoid which, when energized, applies a counter force on said rotor in a direction counter to said force of the biasing mechanism, whereby the rotor moves into an engaged position with said valve body when the solenoid is energized and into an disengaged position with said valve body when the solenoid is de-energized;

a motor to rotate the rotor when the rotor is in the disengaged position;

a water level sensor for fluid communication with the pool drain line to sense the pool water level, a pressure sensor for fluid communication with the pump and high pressure input of the rotor to sense the pressure of fluid output by the pump;

an electronically controlled valve regulating fluid flow from the water supply line to the pool fill line; and an electronic controller for electrical connection to the pump, the solenoid, the electronically controlled valve, the motor, the water level sensor, and the pressure sensor, whereby the electronic controller automatically:

filters pool water by activating the actuator to align the high pressure input of the rotor to the first port of the valve body and to align the low pressure output of the rotor to the second and fourth ports of the valve body, and then activating the pump;

recognizes a high pressure condition from the pressure sensor, and backflushes the filter by activating the actuator to align the high pressure input of the rotor to the second port of the valve body and to align the low pressure output of the rotor to the first and third ports of the valve body, and then activating the pump;

recognizes an overfull condition from the water level sensor, and wastes pool water by activating the actuator to align the high pressure input of the rotor to the third port of the valve body, and then activating the pump; and recognizes an underfull condition from the water level sensor, and fills the pool with water from the water supply line by activating the electronically controlled valve.

2. An automated pool maintenance system according to claim 1, whereby the multiport valve body includes:

a fifth port also for fluid communication with the filter input port, and the electronic controller also automatically:

rinses the multiport valve body, after the controller backflushes the filter, by activating the actuator to align the high pressure input of the rotor to the fifth port of the valve body and to align the low pressure output of the rotor to the second and third ports of the valve body.

3. An automated pool maintenance system according to claim 2, whereby, the multiport valve body includes:

a sixth port closed to fluid flow, and the electronic controller also automatically:

closes the valve body ports by activating the actuator to align the high pressure input of the rotor to the sixth port of the valve body.

4. An automated pool maintenance system according to claim 1, whereby the electronic controller also automatically recirculates by activating the actuator to align the high pressure input of the rotor to the fourth port of the valve body.

5. An automated pool maintenance system according to claim 1, whereby the water level sensor includes a chamber defining a fluid space, located remotely from the pool and at a vertical level at which a preferred pool water level is equi-positioned within the fluid space in the chamber, the chamber having an upper chamber region and a lower chamber region in fluid communication with each other, the lower chamber region having:

a chamber port in fluid communication with the pool drain line and a floating plug that restricts fluid flow from the lower chamber region to the drain line when the water substantially empties from the lower chamber region.

6. An automated pool maintenance system according to claim 5, wherein the upper chamber region has a minimum water level sensor and a maximum water level sensor to respectively determine when the fluid within the upper chamber region exceeds a maximum water level and falls below a minimum water level.

7. An automated pool maintenance system according to claim 6, wherein:

the lower chamber region includes an inverted frusto-conical chamber connected to the chamber port, and the plug is a floating ball having a diameter greater than the chamber port.

8. An automated pool maintenance system according to claim 6, wherein the lower chamber region further includes a ball retainer plate separating the lower chamber region from the upper chamber region and having perforations large enough to pass pool water between the lower chamber region and the upper chamber region but small enough to prevent the plug from passing from the lower chamber region into the upper chamber region.

9. An automated pool maintenance system according to claim 1, further including a suction valve for connection between said pump and said pool drain line, the suction valve including:

a housing, a pool line for connecting the pool drain line, a suction line for connecting the pump, a bellows inside the housing for connecting the suction line to the pool line, and a tube and solenoid valve for fluidly connecting the housing to the suction line, the solenoid valve also for fluidly connecting an external fluid source.

10. An automated pool maintenance system according to claim 9, wherein the external fluid source is an air source.

11. A multiport valve controlled by an electronic controller, and for use with a water waste line, a pool fill line, a pool drain line, a filter output line, and a filter input line, comprising:

a valve body having a plurality of ports for fluid communication with corresponding ones of the filter input and output lines, water waste line, pool fill line, and pool drain line;

a rotor arranged adjacent to the valve body, having an input rotor port and an output rotor port rotatable relative to the valve body to select a fluid flow condition between a first selected port and a second selected port by aligning the input rotor port to the first selected port and the output rotor port to the second selected port;

a biasing mechanism connected to the rotor and applying a force to the rotor;

a solenoid, in electronic communication with the controller, to counter-force the rotor against the force of the biasing mechanism;

a drive mechanism, in electronic communication with the controller, engaged with the rotor to rotate the rotor;

a location disk rotating with the rotor and having at least one position indicator in a predetermined position of relationship with the rotor input and output ports; and a location sensor in electronic communication with the controller to sense the position indicator of the location disk and further comprising at least one of a water level sensor and a pressure sensor in fluid communication with the port corresponding to the pool drain line.

12. A multiport valve according to claim 11, further including a shaft engaged with the location disk and the drive mechanism, and engaged with the rotor when the solenoid forces the rotor against the force of the biasing mechanism.

13. A multiport valve according to claim 12, further including a coupler between the shaft and the location disk that permits the shaft to move axially but not rotationally relative to the location disk.

14. A multiport valve according to claim 11, wherein the indicator is in the location disk and the location sensor is an optical sensor.

15. A multiport valve according to claim 11, further including multiple indicators formed as slots arranged around the location disk, one of said multiple indicators formed as two closely spaced slots, and wherein the location sensor is a pair of similarly closely spaced optical sensors.

16. A multiport valve according to claim 11, in which the fluid flow condition between the first selected port and the second selected port occurs from said first selected port through the filter and thereafter into said second selected port.

17. An automated pool maintenance system comprising:
a multi-port valve body having,
a first port,
a second port,
a third port, and
a fourth port,
an actuator connected to the multi-port valve body to control fluid connection between said valve body ports, the actuator including:
a rotor arranged adjacent to the valve body, and having a high pressure input and also having a low pressure output, and rotating relative to the valve body to select a fluid flow condition originating at at least a first selected port of the valve body and continuing through at least a second selected port of the valve body by aligning the high pressure input to the first selected port and the low pressure output to the second selected port;
a biasing mechanism applying a force on said rotor tending to disengage the rotor away from the valve body;
a solenoid which, when energized, applies a counter force on said rotor in a direction counter to said force of the biasing mechanism, whereby the rotor moves into an engaged position with said valve body when the solenoid is energized and into a disengaged position with said valve body when the solenoid is de-energized; and further comprising at least one of a water level sensor and a pressure sensor in fluid communication with one of said ports
a motor to rotate the rotor when the rotor is in the disengaged position;
an electronic controller electrically connected to the solenoid, the motor, and the at least one sensor, to automatically rotate the rotor relative to the valve body to select the fluid flow condition originating at at least the first selected port of the valve body and continuing through at least the second selected port of the valve body.

18. An automated pool maintenance system according to claim 17, whereby the multiport valve body includes:
fifth and sixth ports.

19. An automated pool maintenance system according to claim 18, whereby
the sixth port is closed to fluid flow, and
the electronic controller automatically closes the valve body ports by activating the actuator to align the high pressure input of the rotor to the sixth port of the valve body.

* * * * *